United States Patent
Cho et al.

(10) Patent No.: US 10,754,458 B2
(45) Date of Patent: Aug. 25, 2020

(54) TOUCH SCREEN AND DISPLAY DEVICE HAVING THE SAME

(71) Applicant: Samsung Display Co., Ltd., Yongin-si (KR)

(72) Inventors: Sun Haeng Cho, Yongin-si (KR); Jung Moo Hong, Yongin-si (KR); Kyu Young Kim, Yongin-si (KR); Jin Bo Shim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 47 days.

(21) Appl. No.: 15/685,615

(22) Filed: Aug. 24, 2017

(65) Prior Publication Data

US 2018/0101270 A1    Apr. 12, 2018

(30) Foreign Application Priority Data

Oct. 6, 2016   (KR) .......................... 10-2016-0129090

(51) Int. Cl.
    *G06F 3/041*   (2006.01)
    *G06F 3/044*   (2006.01)
    *G02F 1/1343*  (2006.01)
    *G02F 1/1333*  (2006.01)

(52) U.S. Cl.
    CPC .......... *G06F 3/0412* (2013.01); *G02F 1/1343* (2013.01); *G06F 3/044* (2013.01); *G02F 1/13338* (2013.01); *G06F 2203/04103* (2013.01); *G06F 2203/04111* (2013.01)

(58) Field of Classification Search
    None
    See application file for complete search history.

(56) References Cited

U.S. PATENT DOCUMENTS

| | | | |
|---|---|---|---|
| 9,633,916 B2 | 4/2017 | Hong et al. | |
| 2014/0209910 A1* | 7/2014 | Kim | H01L 27/124 257/59 |
| 2014/0320761 A1* | 10/2014 | Misaki | G06F 3/044 349/12 |
| 2015/0109266 A1 | 4/2015 | Hong et al. | |
| 2015/0185903 A1* | 7/2015 | Park | G06F 3/044 345/173 |
| 2015/0199929 A1 | 7/2015 | Kim et al. | |

(Continued)

FOREIGN PATENT DOCUMENTS

| | | |
|---|---|---|
| KR | 10-0761128 | 9/2007 |
| KR | 10-2014-0098949 | 8/2014 |
| KR | 10-2014-0116990 | 10/2014 |

*Primary Examiner* — Matthew Yeung
(74) *Attorney, Agent, or Firm* — H.C. Park & Associates, PLC

(57) ABSTRACT

A touch screen for a display device includes a base substrate having a sensing area, and a peripheral area disposed around the sensing area; an insulating layer including at least one contact hole; a sensor provided in the sensing area; and sensing lines connected to the sensor, the sensing lines comprising a first metal layer disposed in the periphery area, and a second metal layer electrically connected to the first metal layer through the contact hole. At least some of the sensing lines include a first portion adjacent to the contact hole, and a second portion spaced from the first portion, with the first portion and the second portion having different widths.

17 Claims, 10 Drawing Sheets

(56) References Cited

U.S. PATENT DOCUMENTS

2016/0202833 A1* 7/2016 Kim, II ................. G06F 3/0416
                                                    345/173
2016/0216802 A1* 7/2016 Bao ....................... G06F 3/0412
2016/0349889 A1* 12/2016 Yang ................... G02F 1/13338

* cited by examiner

TOUCH SCREEN AND DISPLAY DEVICE HAVING THE SAME

CROSS-REFERENCE TO RELATED APPLICATION

This application claims priority from and the benefit of Korean Patent Application No. 10-2016-0129090, filed on Oct. 6, 2016, which is hereby incorporated by reference for all purposes as if fully set forth herein.

BACKGROUND

Field

The invention relates generally to a touch screen and a display device having the same, and more particularly, to touch screen capable of enhancing touch sensitivity by minimizing contact resistance of sensing lines and a display device having the same.

Discussion of the Background

Touch screens may be classified into a resistive touch screen, a capacitive touch screen, and an electromagnetic touch screen according to their method of operation. The capacitive touch screen may include, to more precisely sense a change in capacitance, a plurality of sensing electrodes which are electrically connected to each other, and a plurality of sensing lines which are connected to the sensing electrodes.

To reduce the resistance of the sensing lines, the sensing lines may be configured to have a double-layer structure such that a lower metal layer and an upper metal layer are connected to each other through contact holes.

In display devices having such touch screens, with the recent trend to reduce the size of a non-display area, the widths of the sensing lines disposed on the non-display area also may be reduced, so that the sizes of the contact holes may also be reduced.

The above information disclosed in this Background section is only for enhancement of understanding of the background of the inventive concepts, and, therefore, it may contain information that does not form the prior art that is already known in this country to a person of ordinary skill in the art.

SUMMARY

Applicants have discovered that as the size of the contact holes is reduced, the contact resistance of the sensing lines having the double-layer structure is increased, so that the touch sensitivity of the sensing electrodes connected to the sensing lines may be reduced. Apparatus constructed according to the principles of the invention may enhance touch sensitivity by minimizing contact resistance of sensing lines.

Additional aspects will be set forth in the detailed description which follows, and, in part, will be apparent from the disclosure, or may be learned by practice of the inventive concepts.

According to one aspect of the invention, a touch screen constructed according to the principles of the invention includes a base substrate including a sensing area, and a peripheral area disposed around the sensing area; an insulating layer including at least one contact hole; a sensor provided in the sensing area; and sensing lines connected to the sensor, the sensing lines including a first metal layer disposed in the periphery area, and a second metal layer electrically connected to the first metal layer through the contact hole. At least some of the sensing lines include a first portion adjacent to the contact hole and a second portion spaced from the first portion, with the first portion and the second portion having different widths.

The width of the first portion may be greater than the width of the second portion.

The first portion of at least some of the sensing lines may be disposed at a position different from a position of the first portion of an adjacent sensing line.

Each of the sensing lines may comprise a plurality of contact holes.

The sensing lines may include a first sensing line group including odd number-th sensing lines extending in a lengthwise direction, and a second sensing line group including even number-th sensing lines disposed between the odd number-th sensing lines.

The contact holes in the first sensing line groups and the contact holes in the second sensing line groups may be alternately disposed along the lengthwise direction in the base substrate.

The first metal layer may have a width substantially equal to a width of the second metal layer.

The insulating layer may be any one of an inorganic insulating layer including inorganic material, and an organic insulating layer including organic material.

Each of the sensing lines may have different width each other.

The width of at least some of the sensing lines may decrease as the sensing line becomes closer to the sensing area.

The sensor may include a first sensing unit extending in a first direction, and a second sensing unit extending in a second direction intersecting the first direction.

The sensor may include a sensing unit.

The insulating layer may be disposed over the base substrate, and the second metal layer may be disposed over the first metal layer.

According to another aspect of the invention, a display device constructed according to the principles of the invention includes a display panel to display an image; and a touch screen disposed on at least one surface of the display panel and sensing a location of a touch. The display panel may include a base substrate comprising a display area including a plurality of pixel areas and a non-display area disposed around the display area; an insulating layer including at least one contact hole; and metal lines disposed in the non-display area and connected to the respective pixel areas, at least some of the metal lines including a first metal layer disposed on the base substrate, and a second metal electrically connected to the first metal layer through the contact hole. At least some of the metal lines include a first portion adjacent to the contact hole, and a second portion distal from the contact hole, with the first portion and the second portion having different widths.

The width of the first portion may be greater than the width of the second portion.

The width of the first metal layer may be substantially equal to the width of the second metal layer.

The display panel may include at least one thin-film transistor provided in each of the pixel areas, a light-emitting element connected to the thin-film transistor, and a driver configured to drive the thin-film transistor and the light-emitting element.

At least some of the metal lines may include a fan-out line to provide a signal from the driver to the corresponding pixel area.

The thin-film transistor may include an active pattern disposed on the base substrate, a gate electrode disposed on the active pattern and a source electrode, and a drain electrode connected to the active pattern.

The light-emitting element may include a first electrode connected to the thin-film transistor, a light-emitting layer disposed on the first electrode, and a second electrode disposed on the light-emitting layer.

The touch screen may include a base substrate including a sensing area, and a peripheral area disposed around the sensing area; an insulating layer including at least one contact hole; a sensor provided in the sensing area; and sensing lines connected to the sensor, the sensing lines including a first metal layer disposed in the periphery area, and a second metal layer electrically connected to the first metal layer through the contact hole. At least some of the sensing lines may include a first portion adjacent to the contact hole and a second portion spaced from the first portion, with the first portion and the second portion having different widths.

The first portion of at least some of the sensing lines may be disposed at a position different from a position of the first portion of an adjacent sensing line.

The insulating layer may be disposed over the base substrate, and the second metal layer is disposed over the first metal layer.

The sensor may include a sensing unit.

The foregoing general description and the following detailed description are exemplary and explanatory and are intended to provide further explanation of the claimed subject matter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

DETAILED DESCRIPTION OF THE ILLUSTRATED EMBODIMENTS

Figure 1:
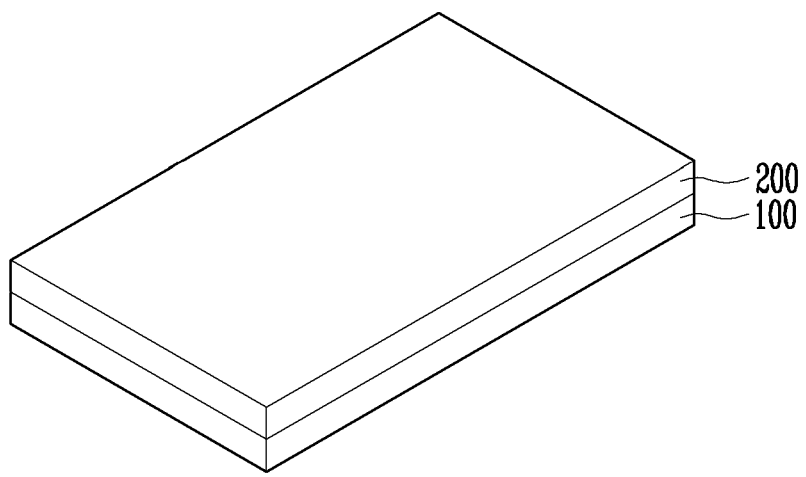
FIG. 1 is a perspective view of a display device constructed according to the principles of the invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

Unless otherwise specified, the illustrated exemplary embodiments are to be understood as providing exemplary features of varying detail of various exemplary embodiments. Therefore, unless otherwise specified, the features, components, modules, layers, films, panels, regions, and/or aspects of the various illustrations may be otherwise combined, separated, interchanged, and/or rearranged without departing from the disclosed exemplary embodiments. Further, in the accompanying figures, the size and relative sizes of layers, films, panels, regions, etc., may be exaggerated for clarity and descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. Further, the x-axis, the y-axis, and the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
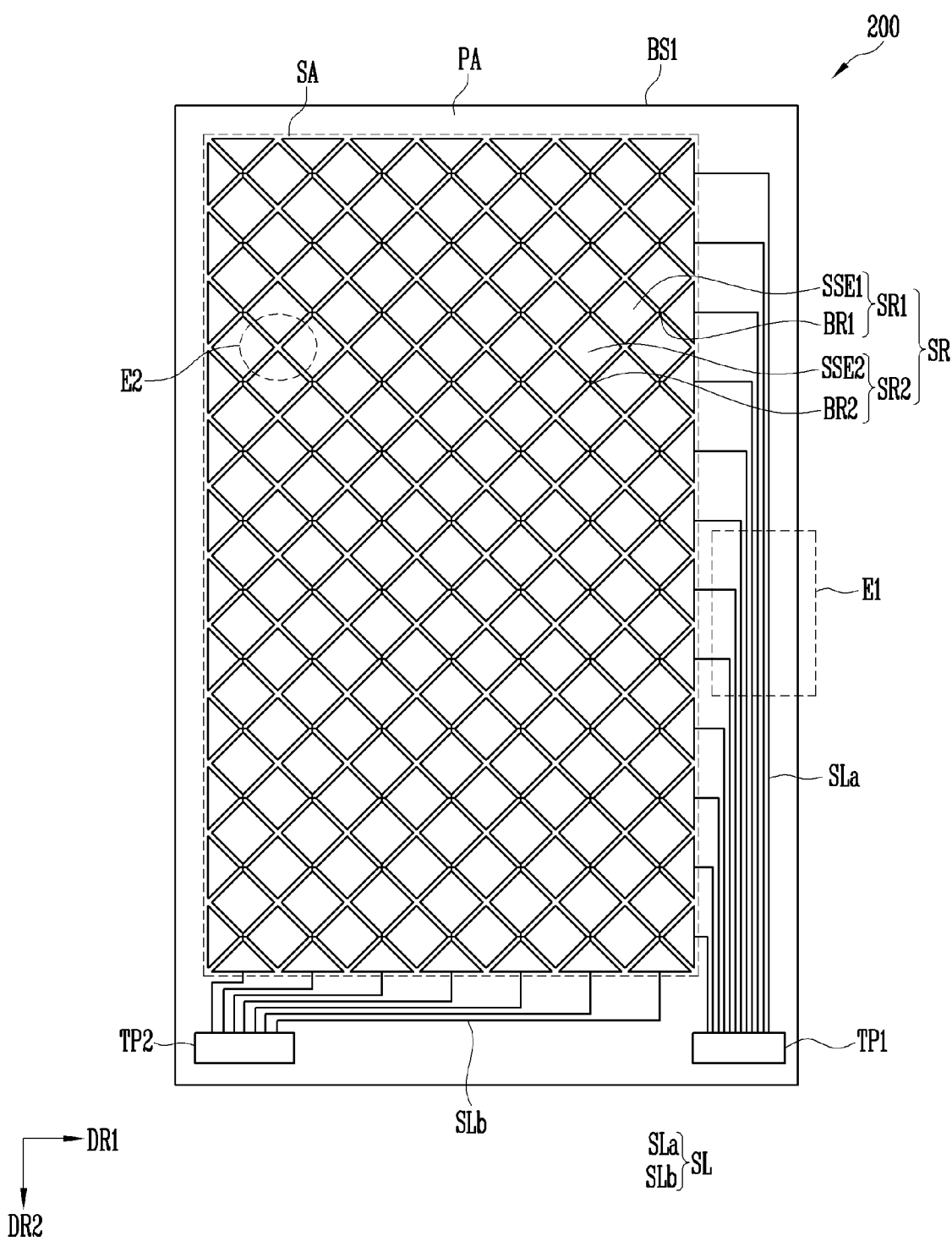
FIG. 2 is a plan view of a touch screen of FIG. 1.

FIG. 1 is a perspective view of a display constructed according to the principles of the invention. FIG. 2 is a plan view of a touch screen 200 of FIG. 1, and FIG. 3 is a plan view of a display panel 100 of FIG. 1.

Figure 3:
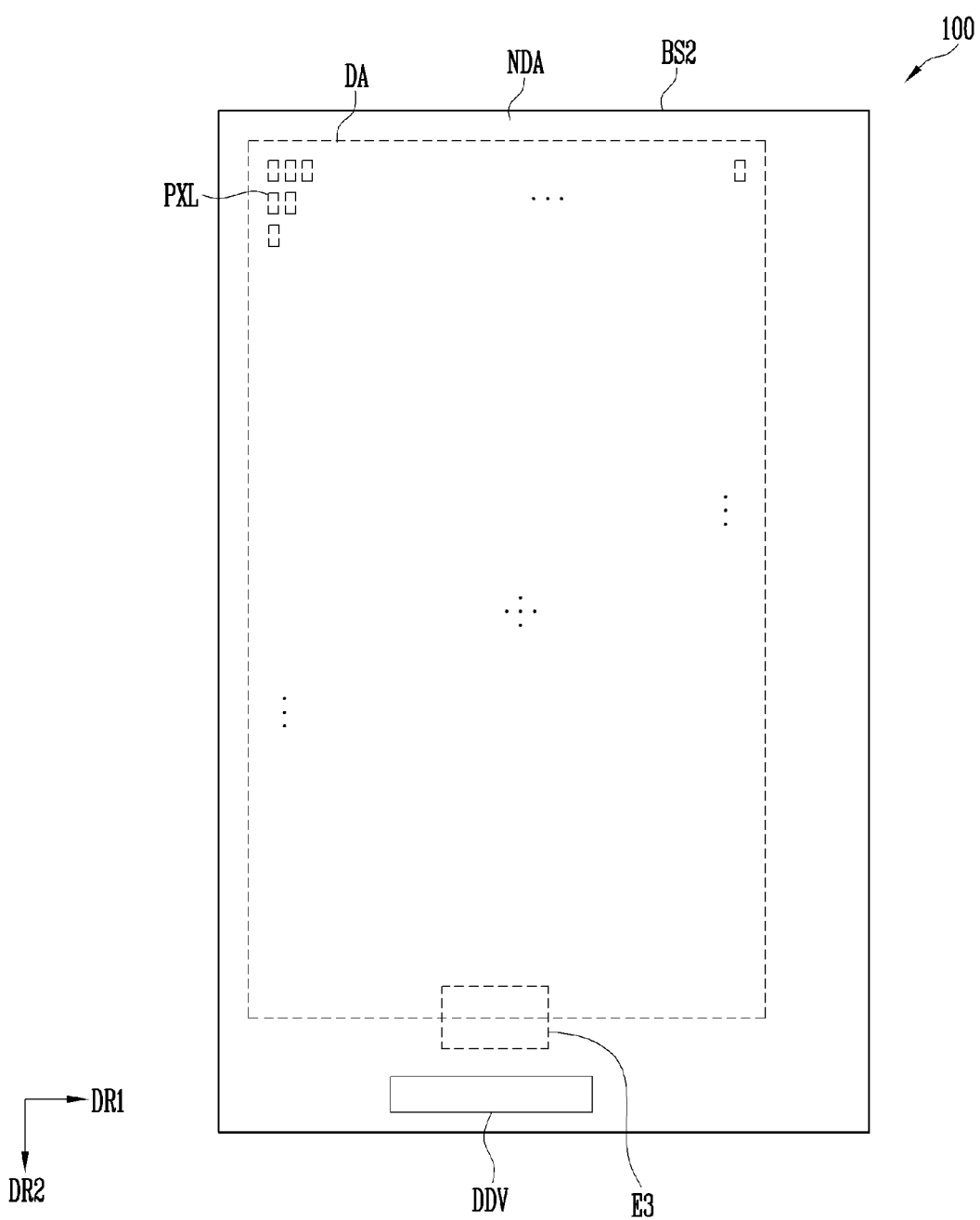
FIG. 3 is a plan view of a display panel of FIG. 1.

Referring to FIGS. 1 to 3, the display device constructed according to the principles of the invention may be provided in various forms, for example, in the form of a rectangular plate having two pairs of parallel sides. In the case where the display device is provided in the form of a rectangular plate, one pair of sides of the two pairs of sides may be longer than the other.

In an exemplary embodiment, for the sake of explanation, there is illustrated an example in which the display device has a rectangular form with a pair of long sides and a pair of short sides. The direction in which the short sides extend refers to a first direction DR1, and the direction in which the long sides extend refers to a second direction DR2.

The display device may include the display panel 100 provided with display elements (not shown) for displaying an image, and a touch screen 200 configured to recognize a touch.

The display device may include a display area DA on which an image generated from the display panel 100 is displayed, a non-display area NDA provided on at least one side of the display area DA, a sensing area SA configured to sense a touch of a user on the touch screen 200 and/or the pressure of the touch, and a peripheral area PA provided on at least one side of the sensing area SA. The sensing area SA may overlap the display area DA. The area of the sensing area SA may be substantially equal to or greater than that of the display area DA.

The touch screen 200 may be provided on a surface of the display panel 100 on which the image is displayed. Alternatively, the touch screen 200 may be integrally formed with the display panel 100. The illustrated embodiment shows an example in which the touch screen 200 is provided on a top surface of the display panel 100.

The touch screen 200 may include a first base substrate BS1 having the sensing area SA and the peripheral area PA.

The first base substrate BS1 may be formed of various materials, e.g., glass, polymer metal, etc. The first base substrate BS1 may be an insulating substrate formed of, particularly, polymer organic material. Examples of the material of the insulating substrate including the polymer organic material may include polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material of the first base substrate BS1 is not limited to these materials. For example, the first base substrate BS1 may be formed of fiber glass reinforced plastic (FRP).

The sensing area SA may correspond to the display area DA of the display panel 100. The peripheral area PA may be disposed adjacent to the sensing area SA. The peripheral area PA may correspond to the non-display area NDA of the display panel 100.

The touch screen 200 may include a touch sensing unit provided in the sensing area SA, a line unit disposed in the peripheral area PA, and a touch sensor pad unit connected to the line unit.

The touch sensing unit may recognize a touch event of the finger of the user or a separate touch input device (e.g., stylus pen) on the display device. In an exemplary embodiment, the touch sensing unit may be operated by a mutual capacitance method in which a change in capacitance by interaction between adjacent sensing and driving electrodes is sensed. Other methods of operation may be used. For instance, the touch sensing unit may include sensing electrodes arranged in a matrix form, and sensing lines may be connected to the respective sensing electrodes, and thus be operated by a self-capacitance method in which, when a touch of the user is generated, a change in capacitance of a sensing electrode of a touched area is sensed.

The touch sensing unit may include a touch sensor SR provided in the sensing area SA, sensing lines connected to the touch sensor SR, and a touch sensor pad unit TP1, TP2 disposed at the ends of the sensing lines.

The touch sensor SR may be configured to sense, when a touch of the user is generated on the display device, the touch of the user and/or the pressure of the touch, and may be provided in the display area DA of a second base substrate BS2.

The touch sensor SR may include a plurality of first sensing units SR1 which extend in the first direction DR1, and to which a sensing input voltage is applied, and a plurality of second sensing units SR2 which extend in the second direction DR2 intersecting the first direction DR1. The plurality of second sensing units SR2 may function to output sensing output signals. For example, when the touch is generated on the display device in which the first sensing units and the second sensing units are located, sensing output signals having a magnitude proportional to the capacitance variance between the first and second sensing units may be output through the second sensing units.

The first sensing units SR1 may include a plurality of first sensing electrodes SSE1 which are arranged in the first direction DR1, and a plurality of first bridges BR1 which connect adjacent first sensing electrodes SSE1 to each other. Each of the first sensing electrodes SSE1 may be provided in various shapes, e.g., a bar shape, or a polygonal shape including a rectangular shape such as a rhombus shape.

In an exemplary embodiment, the first sensing electrodes SSE1 and the first bridges BR1 (see FIG. 6) may be provided in the form of a solid plate or a mesh formed of thin lines.

The second sensing units SR2 may include a plurality of second sensing electrodes SSE2 which are arranged in the second direction DR2, and a plurality of second bridges BR2 (see FIG. 6) which couple adjacent second sensing electrodes SSE2 to each other. Each of the second sensing electrodes SSE2 may be provided in various shapes, e.g., a bar shape, or a polygonal shape including a rectangular shape such as a rhombus shape.

The second sensing electrodes SSE2 and the second bridges BR2 may also be provided in the form of a solid plate or a mesh formed of thin lines.

The first sensing electrodes SSE1 and the second sensing electrodes SSE2 may be alternately arranged in a matrix form on the first base substrate BS1.

The first sensing units SR1 and the second sensing units SR2 are insulated from each other. In FIG. 2, the first bridges BR1 and the second bridges BR2 have been illustrated as intersecting with each other, but actually the first and second bridges BR1 and BR2 are insulated from each other by an insulating layer interposed therebetween. (See FIG. 7.) The first sensing units SR1 and the second sensing units SR2 may be provided on different layers, but the exemplary embodiments are not limited thereto. For example, in the illustrated embodiment, the first sensing electrodes SSE1 and the second sensing electrodes SSE2 are provided on the same layer, and the first bridges BR1 and the second bridges BR2 are provided on different layers.

The sensing lines SLa and SLb (hereinafter, referred to as 'SL') may be provided in the peripheral area PA so as to couple the touch sensor SR to a driving unit for driving the touch sensor SR, as is known in the art. In the illustrated embodiment, the sensing lines SL may include a plurality of first sensing lines SLa and a plurality of second sensing lines SLb.

The first sensing lines SLa are connected to the first sensing units SR1. Each first sensing line SLa may be connected to a corresponding row of the first sensing units SR1. In a plan view, the first sensing lines SLa may be bent several times in the peripheral area PA.

The second sensing lines SLb are connected to the second sensing units SR2. Each second sensing line SLb may be connected to a corresponding column of the second sensing units SR2. In a plan view, the second sensing lines SLb may be bent several times in the peripheral area PA.

The driving unit may be provided on the second base substrate BS2 of the display panel 100 or on an external unit, e.g., a separate printed circuit board, and may include a location detection circuit. The sensing lines SL may transmit sensing input signals from the driving unit to the first sensing units SR1 and/or the second sensing units SR2, or transmit sensing output signals from the first sensing units SR1 and/or the second sensing units SR2 to the driving unit. For example, the first sensing lines SLa may transmit sensing input signals from the driving unit to the first sensing units SR1 and the second sensing lines SLb may transmit sensing output signals from the second sensing units SR2 to the driving unit.

The touch sensor pad unit TP1 and TP2 (hereinafter, referred to as 'TP') may be provided to transmit a signal from or to the driving unit between the touch sensor SR and the driving unit. The touch sensor pad unit TP is provided in the peripheral area PA and connected to the ends of the sensing lines SL. The touch sensor pad unit TP may be connected to pad units of the display panel 100 through conductive members.

The touch sensor pad unit TP may include a first touch sensor pad unit TP1 provided on the ends of the first sensing lines SLa, and a second touch sensor pad unit TP2 provided on the ends of the second sensing lines SLb. In a plan view, the first touch sensor pad unit TP1 and the second touch sensor pad unit TP2 may be provided at positions adjacent to each other or at positions spaced apart from each other. In the illustrated embodiment, the first touch sensor pad unit TP1 and the second touch sensor pad unit SP2 are provided in the peripheral area PA of the first base substrate BS1 at respective positions spaced apart from each other in the first direction DR1, but other configurations are possible. For example, the first and second touch sensor pads TP1 and TP2 may be provided as a single touch sensor pad unit.

The touch sensor SR, the sensing lines SL, and the touch sensor pad unit TP may be made of conductive material. Examples of the conductive material may include a metal, an alloy of metals, a conductive polymer, a conductive metal oxide, and nano-conductive material. Examples of the metal may include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, and lead. Furthermore, examples of the conductive polymer may include a polythiophene-based compound, a polypyrrole-based compound, a polyaniline-based compound, a polyacetylene-based compound, and a polyphenylene-based compound, and mixtures thereof. In particular, a poly-3,4-ethylenedioxythiophene/polystyrenesulfonate (PEDOT/PSS) compound of the polythiophene-based compound may be used. Examples of the conductive metal oxide may include indium tin oxide (ITO), indium zinc oxide (IZO), antimony zinc oxide (AZO), indium tin zinc oxide (ITZO), zinc oxide (ZnO), and tin oxide (SnO2). In addition, examples of the nano-conductive compound may include a silver nanowire (AgNW), a carbon nanotube, and graphene.

The display panel 100 may display arbitrary visual information, e.g., a text, a video, a photograph, and a two- or three-dimensional image. Hereinafter, the arbitrary visual information will refer to "image". The type of the display panel 100 is not important so long as it can display an image.

The display panel 100 may include the second base substrate BS2 having the display area DA and the non-display area NDA. The display area DA may be disposed in a central portion of the display panel 100 and have an area greater than that of the non-display area NDA.

The display area DA may include a plurality of pixel areas each of which is provided with a plurality of pixels PXL. The non-display area NDA is provided around the display area DA. The non-display area NDA may be formed on at least one side of the display area DA, or may be formed along the periphery of the display area DA. The non-display area NDA may be provided with a pad unit in which pads of the lines are provided, and a data driver DDV configured to provide data signals to the pixels PXL. The data driver DDV may provide the data signals to the respective pixels PXL through data lines. The data driver DDV may be disposed in a lateral portion of the non-display area NDA and extend a predetermined length in a transverse direction of the non-display area NDA.

In FIG. 3, for clarity, a scan driver, a light-emitting driver, and a timing controller have not been illustrated, but the scan driver, the light-emitting driver, and the timing controller may be provided in the non-display area NDA.

The second base substrate BS2 may be formed of flexible insulating material. The second base substrate BS2 may have a shape corresponding to that of the first base substrate BS1 and have substantially the same shape as that of the first base substrate BS1. The second base substrate BS2 may have the same area as that of the first base substrate BS1 or an area greater than that of the first base substrate BS1.

The second base substrate BS2 may include a plurality of signal lines (not shown) connected to the plurality of pixels PXL, and a plurality of thin-film transistors (not shown) connected to the plurality of signal lines.

Each of the pixels PXL may be an organic light-emitting element including an organic layer, but other types of elements may be used. For example, the pixel PXL may be embodied in various forms such as a liquid crystal element, an electrophoretic element, and an electrowetting element. The plurality of pixels PXL may be provided in the display area DA of the second base substrate BS2. Each pixel PXL may be provided as the minimum unit for displaying an image. The pixel PXL may include an organic light-emitting element which emits white light and/or color light. Each pixel PXL may emit any one color of red, green, blue, and white, or other colors. For example, the pixel PXL may emit a color such as cyan, magenta or yellow. Each pixel PXL may include a thin-film transistor (not shown) connected to the line unit (not shown), and an organic light-emitting element connected to the thin-film transistor (not shown).

The pixel PXL, the plurality of signal lines, and the plurality of thin-film transistors will be described subsequently.

Figure 4:
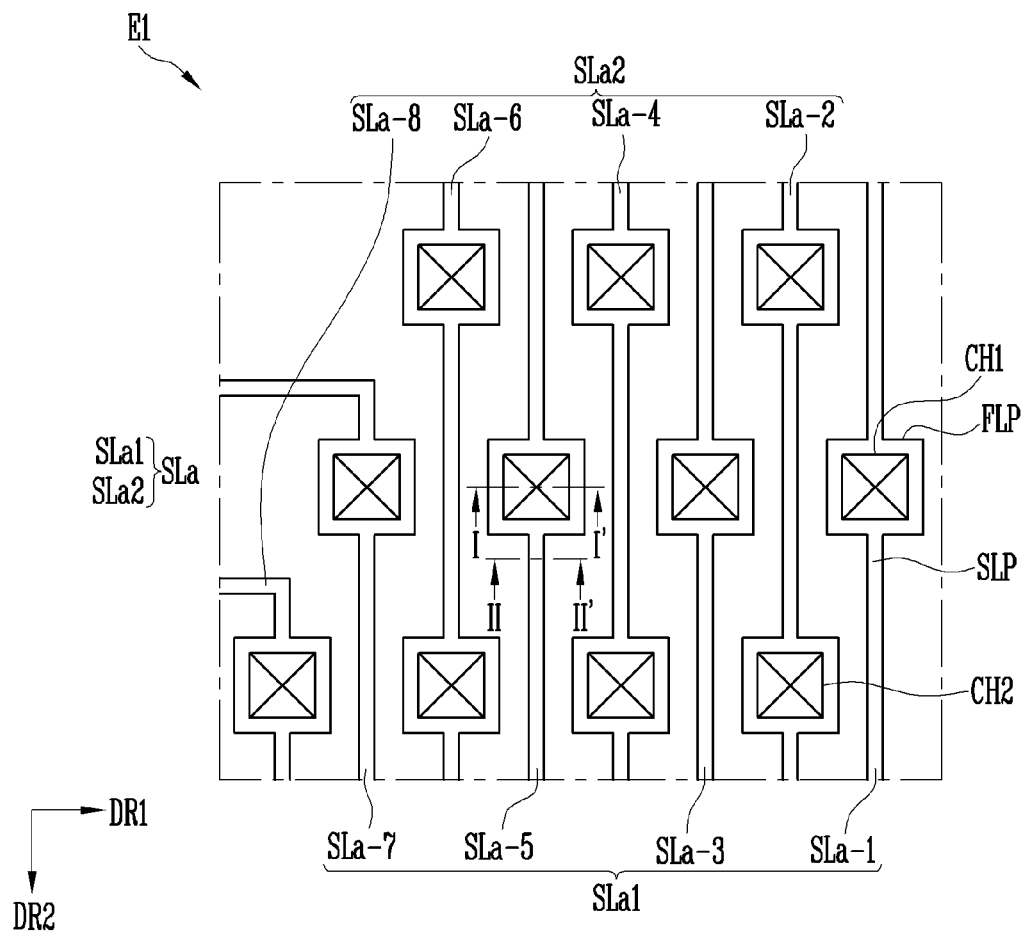
FIG. 4 is a plan view showing an enlargement of portion E1 of FIG. 2.
Figure 5:
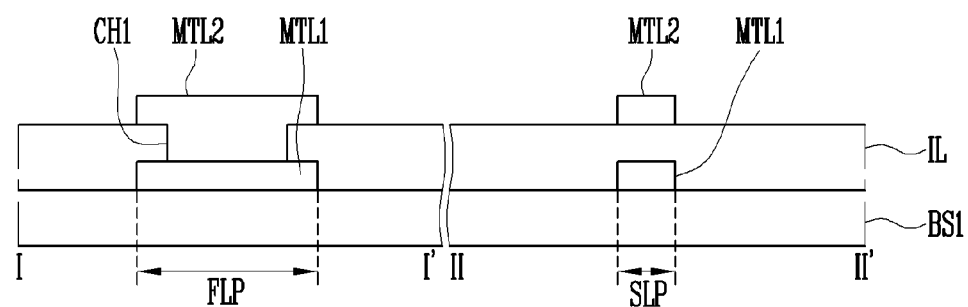
FIG. 5 is a fragmented, cross-sectional view taken along lines I-I' and II-II' of FIG. 4.

FIG. 4 is a plan view showing an enlargement of portion E1 of FIG. 2. FIG. 5 is a fragmented, cross-sectional view taken along lines I-I' and II-II' of FIG. 4.

Referring to FIGS. 2, 4, and 5, the first sensing lines SLa may be provided in the peripheral area PA of the first base substrate BS1 and extend from the first sensing electrodes SSE1 toward the first touch sensor pad TP1 in the second direction DR2.

The first sensing lines SLa may include a first sensing line group SLa1 and a second sensing line group SLa2. The sensing lines included in the first sensing line group SLa1 and the sensing lines included in the second sensing line group SLa2 may be alternately arranged in the first direction DR1 (the row (e.g., transverse) direction) as shown in FIG. 4.

The first sensing line group SLa1 includes odd number-th (or 2n-1-th, n is a natural number) sensing lines SLa-1, SLa-3, SLa-5, and SLa-7. The second sensing line group SLa2 includes even number-th (or 2n-th, n is a natural number) sensing lines SLa-2, SLa-4, SLa-6, and SLa-8. Hereinafter, for the sake of description, the odd number-th sensing lines SLa-1, SLa-3, SLa-5, and SLa-7 refer to "odd number-th sensing line SL2n-1", and the even number-th sensing lines SLa-2, SLa-4, SLa-6, and SLa-8 refer to "even number-th sensing line SL2n".

Each of the odd number-th sensing lines SL2n-1 and even number-th sensing lines SL2n may have at least one contact hole CH1 and CH2 (hereinafter, referred to as 'CH'). FIG. 4 illustrates an example in which one contact hole CH (CH1) corresponds to the odd number-th sensing line SL2n-1, and two contact holes CH (CH2) correspond to the even number-th sensing line SL2n. However, other arrangements are possible. For example, the same number of contact holes CH may be provided in the odd number-th sensing line SL2n-1 and the even number-th sensing line SL2n.

The contact holes CH may include a first contact hole CH1 corresponding to the odd number-th sensing line SL2n-1, and a second contact hole CH2 corresponding to the even number-th sensing line SL2n. In an embodiment, a plurality of first contact holes CH1 and a plurality of second contact holes CH2 may be provided in the first base substrate BS1 and alternately arranged in the second direction DR2 (the column (e.g., lengthwise) direction). Also, the first contact hole CH1 and the second contact hole CH2 may be offset from each other in the first direction DR1 as shown in FIG. 4.

Each of the odd and even number-th sensing lines SL2n-1 and SL2n may be configured to have a double-layer structure on the first base substrate BS1. In detail, each of the odd and even number-th sensing lines SL2n-1 and SL2n may include a first metal layer MTL1 disposed on the first base substrate BS1, and a second metal layer MTL2 which is electrically connected to the first metal layer MTL1 through the first or second contact hole CH1 or CH2. Referring to FIGS. 4 and 5, in a plan view, the first metal layer MTL1 and the second metal layer MTL2 may have substantially the same width.

In an exemplary embodiment, the odd number-th sensing line SL2n-1 may be configured to have a double-layer structure such that the first metal layer MTL1 and the second metal layer MTL2 are electrically connected with each other through the first contact hole CH1.

Each of the first and second metal layers MTL1 and MTL2 of the odd number-th sensing line SL2n-1 may include a first line part FLP which corresponds to the first contact hole CH1, and a second line part SLP which does not correspond to the first contact hole CH1. That is, each of the odd number-th sensing lines may be divided into the first line part FLP which corresponds to the first contact hole CH1, and a second line part SLP which does not correspond to the first contact hole CH1. The width of the first line part FLP may differ from that of the second line part SLP. For example, the width of the first line part FLP may be greater than that of the second line part SLP.

The reason why the width of the first line part FLP is greater than that of the second line part SLP is because the first contact hole CH1 corresponding to the first line part FLP should have a predetermined minimum size. In detail, the odd number-th sensing line SL2n-1 may have a double-layer structure to reduce the line resistance, as described above. Here, the first metal layer MTL1 and the second metal layer MTL2 are electrically connected to each other through the first contact hole CH1. Given this, if the size of the first contact hole CH1 is comparatively small, the contact resistance of the first contact hole CH1 is increased, whereby the line resistance of the odd number-th sensing line SL2n-1 may be increased. To prevent this phenomenon, the size of the first line part FLP corresponding to the first contact hole CH1 is designed to be larger than that of the second line part SLP.

The even number-th sensing line SL2n may be designed in the same manner as that of the odd number-th sensing line SL2n-1.

In a plan view, the first line part FLP of the odd number-th sensing line SL2n-1 and the first line part FLP of the even number-th sensing line SL2n are offset from each other in the first base substrate BS1. That is, the first line part FLP of the odd number-th sensing line SL2n-1 and the first line part FLP of the even number-th sensing line SL2n may be offset in the first direction DR1 as shown in FIG. 4. Due to this configuration, each of the first and second contact holes CH1 and CH2 can have a predetermined minimum size or more so as to reduce the contact resistance, and adjacent sensing lines can remain spaced apart from each other.

In detail, in the case where each of the first and second contact holes CH1 and CH2 has a comparatively large size so as to reduce the contact resistance, the width of the first line part FLP corresponding to the contact hole CH1, CH2 is also increased. If the width of the first line part FLP is increased, the first line part FLP may overlap the first line part FLP of an adjacent sensing line or become very close thereto. As a result, the first sensing lines SLa may neither be able to transmit a sensing input signal from the driving unit (not shown) to the first sensing units SR1 nor transmit a sensing output signal from the first sensing units SR1 to the driving unit. To prevent this phenomenon, the first line part FLP of the odd number-th sensing line SL2n-1 and the first line part FLP of the even number-th sensing line SL2n may be designed to be offset from each other in a plan view. In other words, the first line part FLP of the odd number-th sensing line SL2n-1 and the first line part FLP of the even number-th sensing line SL2n are not disposed at the same position in a plan view.

As described above, in the display device constructed in accordance with the principles of the invention, the distance between all or at least some of the sensing lines SL may be maintained constant in a limited area, and the contact resistance of the sensing lines SL having a double-layer structure may also be reduced.

Hereinafter, the sensing lines SL will be described in a stacked structure according to sequential manufacturing process steps with reference to FIG. 5.

Referring to FIG. 5, the first metal layer MTL1 is provided on the first base substrate B S 1.

The first base substrate BS1 may be formed of various materials, e.g., glass, polymer metal, etc. The first base substrate BS1 may be an insulating substrate formed of, particularly, polymer organic material. Examples of the material of the insulating substrate including the polymer organic material may include polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material constituting the first base substrate BS1 is not limited to the foregoing examples.

The first metal layer MTL1 may be made of conductive material. Examples of the conductive material may include a metal, an alloy of metals, a conductive polymer, a conductive metal oxide, and nano-conductive material. Examples of the metal may include copper, silver, gold, platinum, palladium, nickel, tin, aluminum, cobalt, rhodium, iridium, iron, ruthenium, osmium, manganese, molybdenum, tungsten, niobium, tantalum, titanium, bismuth, antimony, and lead. Furthermore, examples of the conductive polymer may include a polythiophene-based compound, a polypyrrole-based compound, a polyaniline-based compound, a polyacetylene-based compound, and a polyphenylene-based compound, and mixtures thereof. In particular, a PEDOT/PSS compound of the polythiophene-based compound may be used. Examples of the conductive metal oxide may include indium tin oxide (ITO), indium zinc oxide (IZO), antimony zinc oxide (AZO), indium tin zinc oxide (ITZO), zinc oxide (ZnO), and tin oxide (SnO2). In addition, examples of the nano-conductive compound may include a silver nanowire (AgNW), a carbon nanotube, and grapheme.

An insulating layer IL is provided on the first metal layer MTL1. The insulating layer IL may be an inorganic insulating layer formed of inorganic material, or an organic insulating layer formed of organic material. Inorganic insulating material such as polysiloxane, silicon nitride, silicon oxide, or silicon oxynitride may be used as the inorganic material. The organic material may be organic insulating material such as a polyacryl-based compound, a polyimide-based compound, a fluorocarbon compound such as Teflon, or a benzocyclobutene compound.

The second metal layer MTL2 is provided on the insulating layer IL. The second metal layer MTL2 may be made of the same material as that of the first metal layer MTL1.

The first and second metal layers MTL1 and MTL2 may have substantially the same width and be provided with the insulating layer IL interposed therebetween. The width of the first and second metal layers MTL1 and MTL2 of the first line part FLP may be greater than that of the first and second metal layers MTL1 and MTL2 of the second line part SLP.

Figure 6:
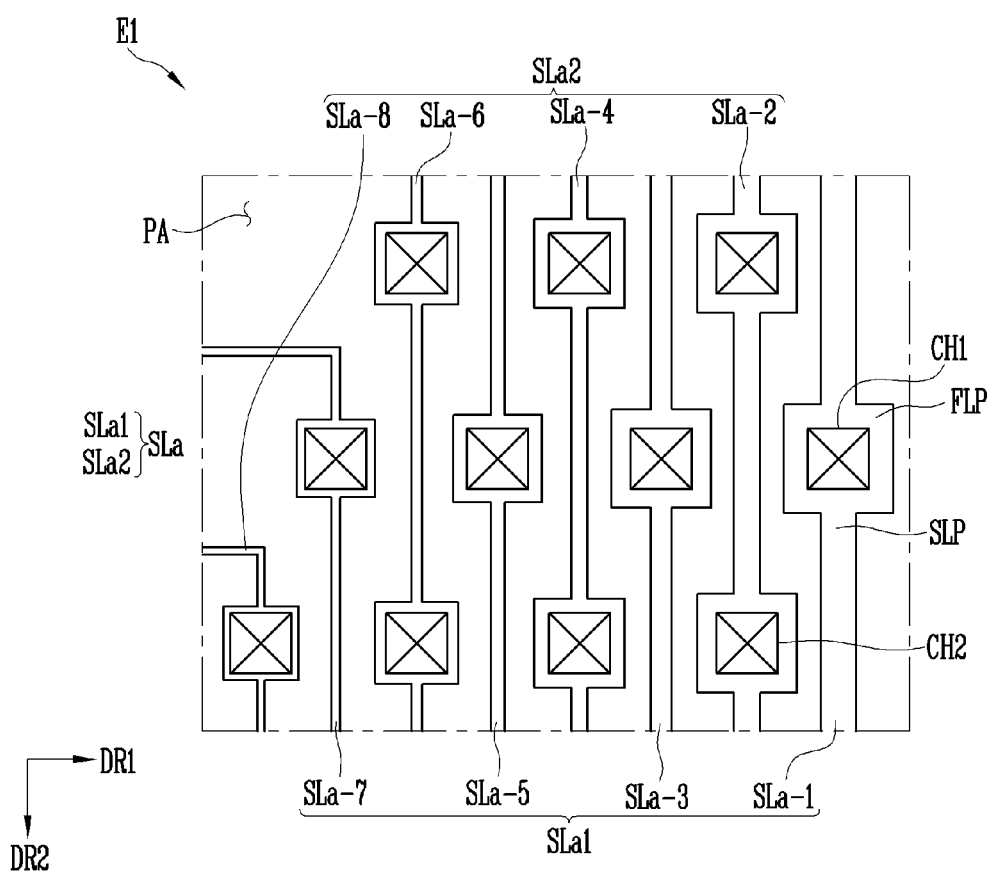
FIG. 6 is a plan view showing an enlargement of portion E1 of FIG. 2 according to another exemplary embodiment.

FIG. 6 is a plan view showing an enlargement of portion E1 of FIG. 2 according to another exemplary embodiment. The following description is focused on differences from the preceding embodiments to avoid redundancy. Components which are not separately explained in the following description of this embodiment are based upon like components described in connection with the preceding embodiments. The same reference numeral will be used to designate the same component, and a similar reference numeral will be used to designate a similar component.

Referring to FIGS. 2 and 6, the first sensing lines (refer to SLa) may be provided in the peripheral area PA of the first base substrate BS1 and extend in the second direction DR2.

The first sensing lines SLa may have different widths. For example, the first sensing lines SLa which are relatively far from the sensing area SA of the touch screen 200 may have comparatively larger widths.

As shown in FIG. 6, the first sensing lines SLa may include a first sensing line group SLa1 and a second sensing line group SLa2. The first sensing line group SLa1 includes odd number-th (or 2n-1-th, n is a natural number) sensing lines SLa-1, SLa-3, SLa-5, and SLa-7. The second sensing line group SLa2 includes even number-th (or 2n-th, n is a natural number) sensing lines SLa-2, SLa-4, SLa-6, and SLa-8. Among the odd number-th sensing lines SLa-1, SLa-3, SLa-5, and SLa-7, the sensing line SLa-1 which is disposed at the outermost position may be designed to have the largest width. Among the even number-th sensing lines SLa-2, SLa-4, SLa-6, and SLa-8, the sensing line SLa-8 which is closest to the sensing area SA may be designed to have the smallest width. The widths of the intermediate sensing lines may increase proportionally based upon the distance from the sensing area SA.

The reason why the first sensing lines SLa are designed to have different widths is to make the line resistances of the first sensing lines SLa substantially uniform.

In detail, the sensing line SLa-1 is disposed at the outermost position in the peripheral area PA and connected to first sensing electrodes (refer to SSE1 of FIG. 3) which are disposed in the sensing area SA in the row farthest from the first touch sensor pad unit (refer to TP1 of FIG. 3). The sensing line SLa-8 is disposed in the peripheral area PA at a position closest to the sensing area SA and connected to first sensing electrodes SSE1 which are disposed in the sensing area SA in the row closest to the first touch sensor pad unit TP1. Thus, the length of the sensing line SLa-1 may be greater than that of the sensing line SLa-8. For example, the length of each of the sensing lines may increase from the $8^{th}$ sensing line SLa-8 to the $1^{st}$ sensing line Sla-1.

In general, the line resistance is proportional to the length of a line. Consequently, the line resistance of the sensing line SLa-1 is higher than that of the sensing line SLa-8. Thus, sensing input signals may not be uniformly applied from the driving unit across the entirety of the sensing area SA. In this case, the touch recognition rate of the touch panel 200 may be reduced or be non-uniform depending upon position.

To reduce or prevent this phenomenon, the first sensing lines SLa may be designed to have different widths. Thereby, the line resistances of the first sensing lines SLa may be substantially uniform, so that the touch recognition rate may be enhanced. For example, the width of the sensing lines may increase gradually and/or proportionally from the $8^{th}$ sensing line SLa-8 to the $1^{st}$ sensing line Sla-1 as shown in FIG. 6.

Figure 7:
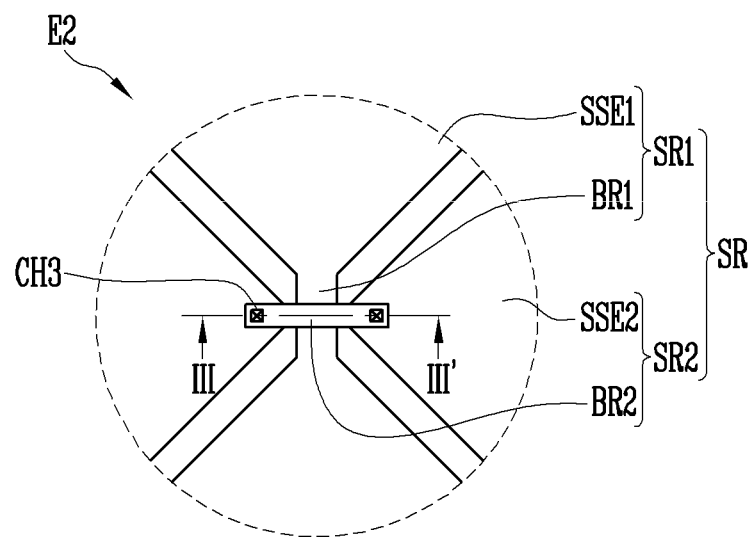
FIG. 7 is a plan view showing an enlargement of portion E2 of FIG. 2.
Figure 8:
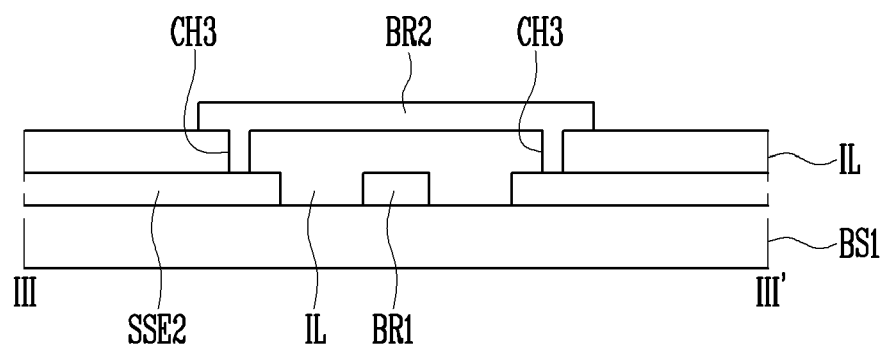
FIG. 8 is a cross-sectional view taken along line of FIG. 7.

FIG. 7 is a plan view showing an enlargement of portion E2 of FIG. 2. FIG. 8 is a cross-sectional view taken along line of FIG. 7.

Referring to FIGS. 2, 7, and 8, the touch panel 200 may include a first base substrate BS1, and first and second sensing units SR1 and SR2 provided on the first base substrate BS1.

The first sensing units SR1 may include first sensing electrodes SSE1, and first bridges BR1 configured to couple adjacent first sensing electrodes SSE1 to each other. The second sensing units SR1 may include second sensing electrodes SSE2, and second bridges BR2 configured to couple adjacent second sensing electrodes SSE2 to each other.

The first sensing electrodes SSE1 and the second sensing electrodes SSE2 may be provided on the first base substrate BS1 and disposed on the same layer. The first sensing electrodes SSE1 and the second sensing electrodes SSE2 may have independent patterns which are not connected to each other. Two adjacent first sensing electrodes SSE1 are connected to each other by the first bridge BR1 which is disposed on the same layer as that of the first sensing electrodes SSE1. Two adjacent second sensing electrodes SSE2 are connected to each other by the second bridge BR2 and a third contact hole CH3 formed in the insulating layer IL.

In accordance with the principles of the invention, the form of a sensing line in which first and second metal layers having substantially the same width are electrically connected to each other through a contact hole may be employed in various electrode devices and, particularly, used as one of a power line of a display device.

Figure 9:
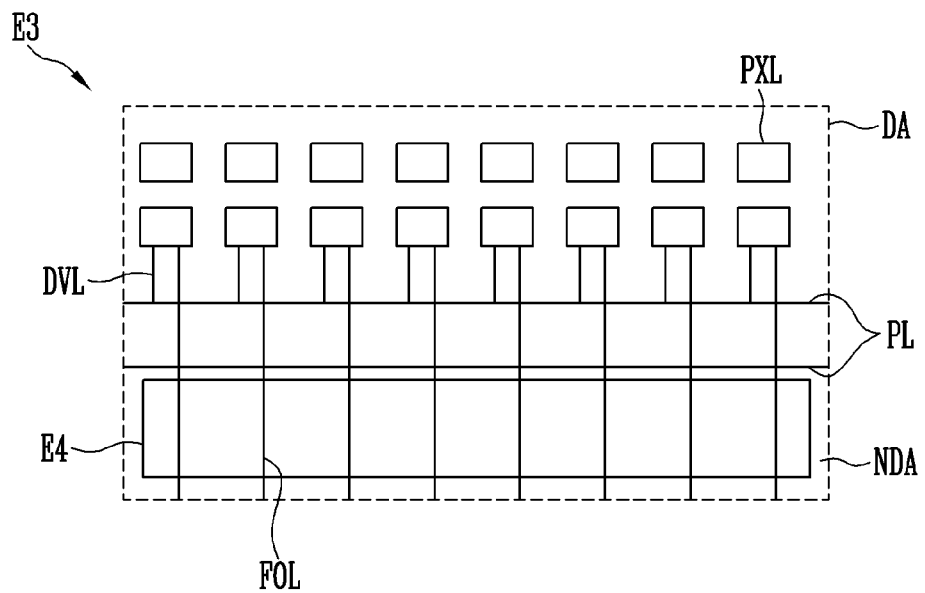
FIG. 9 is a plan view showing an enlargement of portion E3 of FIG. 3.

FIG. 9 is a plan view showing an enlargement of portion E3 of FIG. 3. In FIG. 9, for the sake of description on connection between lines disposed in the display area and the non-display area of the display panel, only portions of power lines are illustrated.

Referring to FIGS. 3 and 9, the display panel 100 in accordance with an exemplary embodiment may include a display area DA provided with a plurality of pixels PXL, and a non-display area NDA disposed around the display area DA.

The plurality of pixels PXL may be arranged in the form of a matrix along a plurality of pixel rows extending in the first direction DR1 and a plurality of pixel columns extending in the second direction DR2, but other configurations are possible.

A data driver DDV, a power line PL, and a plurality of fan-out lines FOL may be provided in the non-display area NDA as is known in the art.

The power line PL may be connected, through a drive voltage line DVL, to the pixels PXL provided in each pixel column. The pixels PXL provided in each pixel column may share the corresponding drive voltage line DVL. Thereby, power applied to the power line PL may be provided to the pixels PXL. A first power supply ELVDD or a second power supply ELVDD may be applied to the power line PL.

A plurality of fan-out lines FOL are disposed between the data driver DDV and the respective pixel columns so that data signals provided from the data driver DDV are supplied to the pixels PXL provided in the respective pixel columns. Each of the fan-out lines FOL may be electrically connected to a data line (not shown) provided in the corresponding pixel column. The plurality of fan-out lines FOL may extend in the non-display area NDA in a pixel column direction, but it is not limited thereto.

Figure 10:
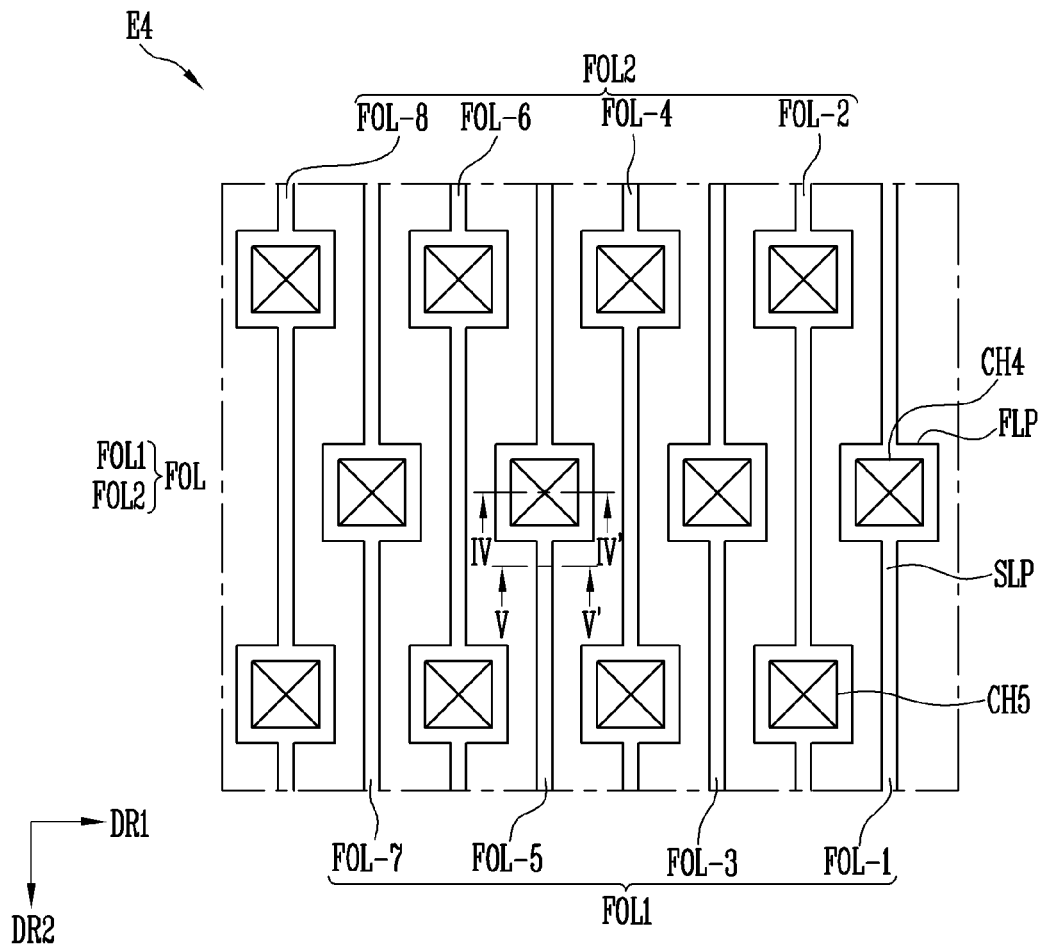
FIG. 10 is a plan view showing an enlargement of portion E4 of FIG. 9.
Figure 11:
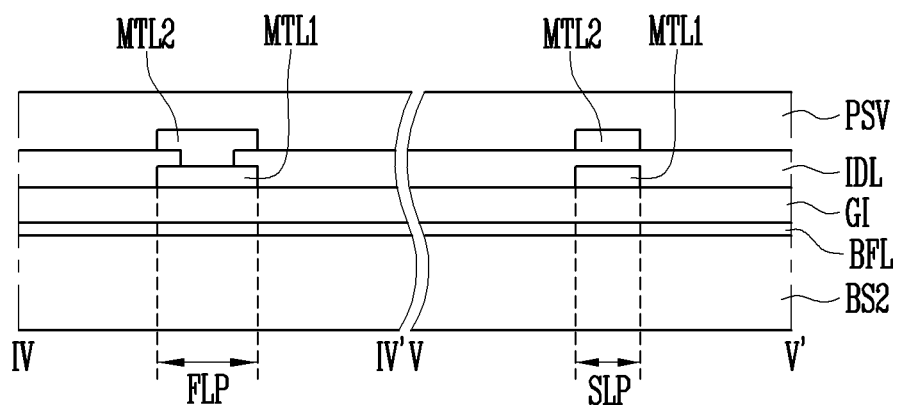
FIG. 11 is a fragmented, cross-sectional view taken along lines IV-IV' and V-V' of FIG. 10.

FIG. 10 is a plan view showing an enlargement of portion E4 of FIG. 9. FIG. 11 is a fragmented, cross-sectional view taken along lines IV-IV' and V-V' of FIG. 10.

Referring to FIGS. 9 to 11, the plurality of fan-out lines FOL may be provided in the non-display area NDA of the second base substrate BS2 and include a first fan-out line group FOL1 and a second fan-out line group FOL2. First fan-out lines included in the first fan-out line group FOL1 and first fan-out lines included in the second fan-out line group FOL2 may be alternately arranged in the first direction DR1 (the transverse direction).

The first fan-out line group FOL1 may include odd number-th (or 2n-1-th, n is a natural number) fan-out lines FOL-1, FOL-3, FOL-5, and FOL-7. The second fan-out line group FOL2 may include even number-th (or 2n-th, n is a natural number) fan-out lines FOL-2, FOL-4, FOL-6, and FOL-8. Hereinafter, for the sake of description, the odd number-th fan-out lines FOL-1, FOL-3, FOL-5, and FOL-7 will refer to "odd number-th fan-out line FOL2$n$-1", and the even number-th fan-out lines FOL-2, FOL-4, FOL-6, and FOL-8 will refer to "even number-th fan-out line FOL2$n$".

Each of the odd and even number-th fan-out lines FOL2$n$-1 and FOL2$n$ may have at least one contact hole CH4, CH5 (hereinafter, referred to as 'CH').

The contact holes CH may include a fourth contact hole CH4 corresponding to the odd number-th fan-out line FOL2$n$-1, and a fifth contact hole CH5 corresponding to the even number-th fan-out line FOL2$n$. In an embodiment, a plurality of fourth contact holes CH4 and a plurality of fifth contact holes CH5 may be provided in the second base substrate BS2 and arranged in the second direction DR2 (the column (e.g., lengthwise) direction). Also, the fourth contact hole CH4 and the fifth contact hole CH5 may be offset in the first direction DR1 as shown in FIG. 10.

Each of the odd and even number-th fan-out lines FOL2n-1 and FOL2n may be configured to have a double-layer structure on the second base substrate BS2. In detail, each of the odd and even number-th fan-out lines FOL2n-1 and FOL2n may include a first metal layer MTL1 provided on the second base substrate BS2, and a second metal layer MTL2 which is electrically connected to the first metal layer MTL1 through the fourth or fifth contact hole CH4 or CH5. In a plan view, the first metal layer MTL1 and the second metal layer MTL2 may have substantially the same width.

In an exemplary embodiment, the odd number-th fan-out line FOL2n-1 may be configured to have a double-layer structure such that the first metal layer MTL1 and the second metal layer MTL2 are electrically connected to each other through the fourth contact hole CH4. Each of the first and second metal layers MTL1 and MTL2 may include a first line part FLP which corresponds to the fourth contact hole CH4, and a second line part SLP which does not correspond to the fourth contact hole CH4. That is, each of the odd number-th fan-out lines may be divided into the first line part FLP which corresponds to the fourth contact hole CH4, and a second line part SLP which does not correspond to the fourth contact hole CH4. The width of the first line part FLP may be greater than that of the second line part SLP. Since the width of the first line part FLP is designed to be greater than that of the second line part SLP, the fourth contact hole CH4 may have a predetermined minimum size or greater.

The even number-th fan-out line FOL2n may be configured to have a double-layer structure such that the first metal layer MTL1 and the second metal layer MTL2 are electrically connected to each other through the fifth contact hole CH5. Each of the first and second metal layers MTL1 and MTL2 may include a first line part FLP which corresponds to the fifth contact hole CH5, and a second line part SLP which does not correspond to the fifth contact hole CH5. That is, each of the even number-th fan-out lines may be divided into the first line part FLP which corresponds to the fifth contact hole CH5, and a second line part SLP which does not correspond to the fifth contact hole CH5. The width of the first line part FLP may be greater than that of the second line part SLP. Since the width of the first line part FLP is designed to be greater than that of the second line part SLP, the fifth contact hole CH5 may have a predetermined minimum size or greater.

The first line part FLP of the odd number-th fan-out line FOL2n-1 and the first line part FLP of the even number-th fan-out line FOL2n are disposed to be offset from each other on the second base substrate BS2 in a plan view. That is, the first line part FLP of the odd number-th fan-out line FOL2n-1 and the first line part FLP of the even number-th fan-out line FOL2n are offset in the first direction DR1 as shown in FIG. 10. Due to this configuration, at least some or each of the fourth and fifth contact holes CH4 and CH4 can have a predetermined minimum size or greater so as to reduce the contact resistance, and adjacent fan-out lines FOL can remain spaced apart from each other.

Hereinafter, the fan-out lines FOL will be described in a stacked structure according to sequential manufacturing process steps with reference to FIG. 11.

Referring to FIG. 11, a buffer layer BFL and a gate insulating layer GI are successively provided on the second base substrate BS2.

The first metal layer MTL1 is provided on the gate insulating layer GI.

The first metal layer MTL1 may be made of conductive material. Examples of the conductive material may include a metal, an alloy of metals, a conductive polymer, a conductive metal oxide, and nano-conductive material.

An interlayer insulating layer IDL is provided on the first metal layer MTL1.

The second metal layer MTL2 is provided on the interlayer insulating layer IDL. The second metal layer MTL2 may be made of the same material as that of the first metal layer MTL1. The first and second metal layers MTL1 and MTL2 may have substantially the same width and be provided with the interlayer insulating layer IDL interposed therebetween. The width of the first and second metal layers MTL1 and MTL2 of the first line part FLP may be greater than that of the first and second metal layers MTL1 and MTL2 of the second line part SLP.

A protective layer PSV is provided on the first and second metal layers MTL1 and MTL2.

Figure 12:
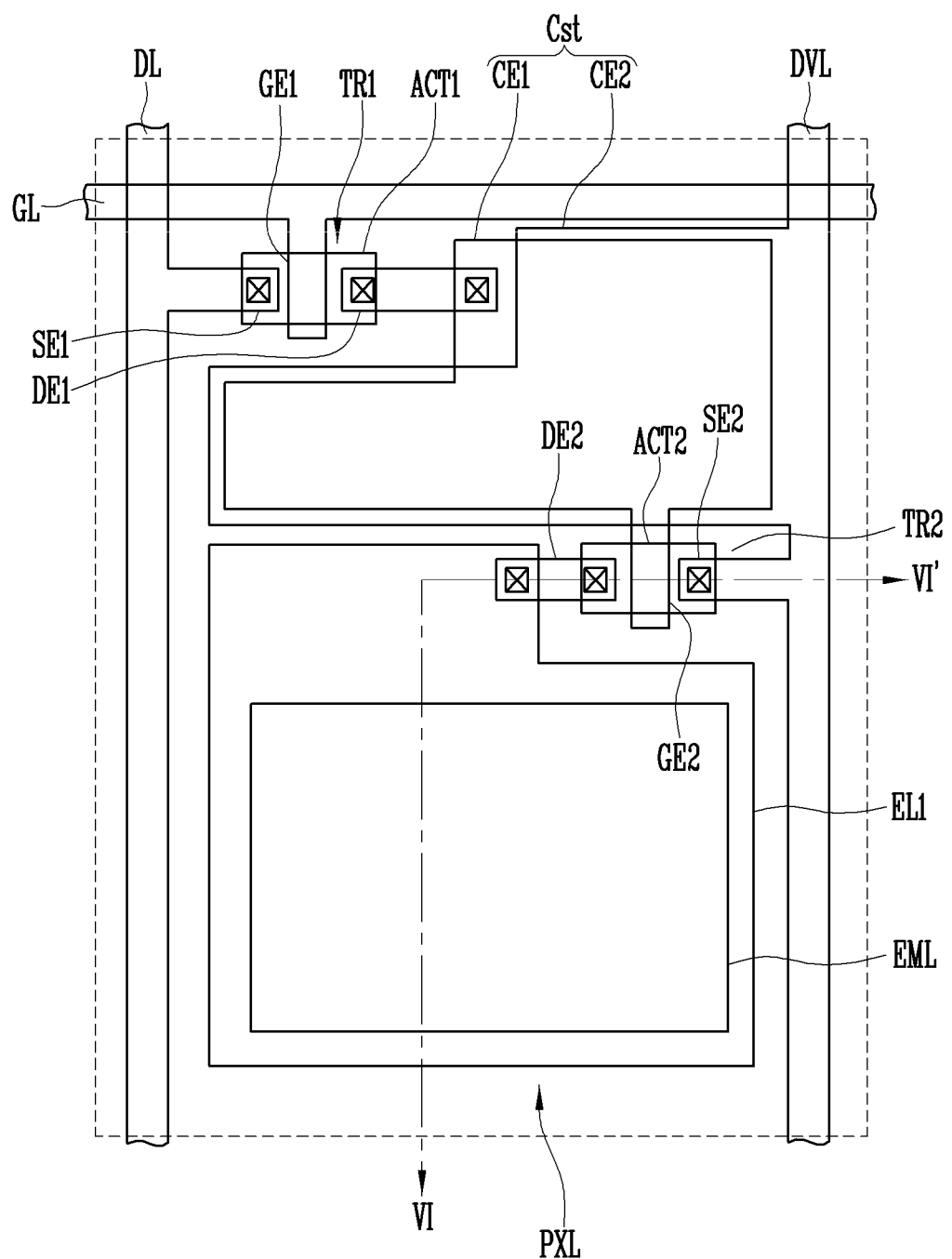
FIG. 12 is a plan view corresponding to any one of a plurality of pixels provided in the display panel of FIG. 3.
Figure 13:
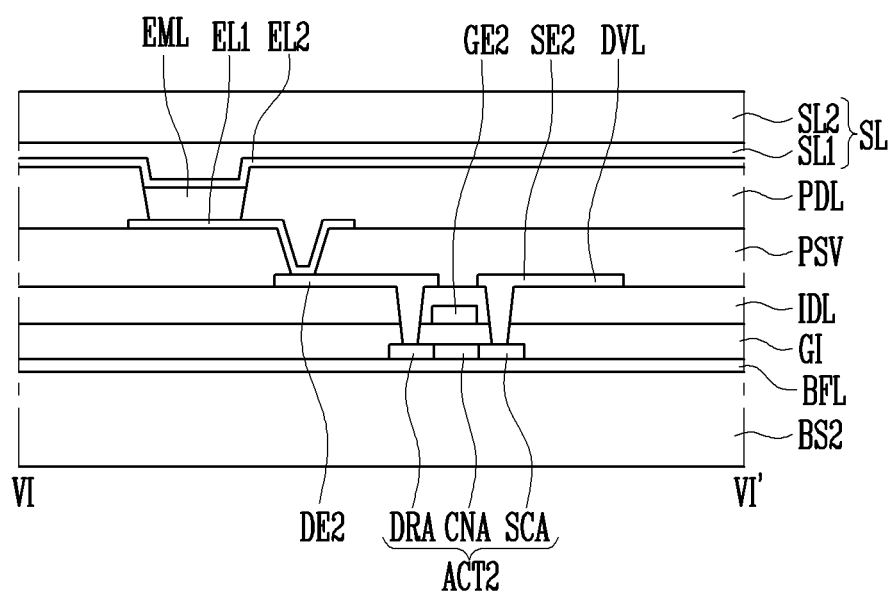
FIG. 13 is a cross-sectional view taken along line VI-VI' of FIG. 12.

FIG. 12 is a plan view corresponding to one of the plurality of pixels provided on the display panel of FIG. 3. FIG. 13 is a cross-sectional view taken along line VI-VI' of FIG. 12.

Referring to FIGS. 3, 12, and 13, each pixel PXL is connected to one of the signal lines. The signal lines may provide a signal to each pixel PXL and include a gate line GL, a data line DL, and a drive voltage line DVL. As needed, the signal lines may further include other lines.

The gate line GL may extend in any one of the first and second directions DR1 and DR2. The data line DL may extend in a direction intersecting the gate line GL. The gate line GL may transmit a scan signal to a thin-film transistor. The data line DL may transmit a data signal to the thin-film transistor. The drive voltage line DVL may provide a drive voltage to the thin-film transistor.

In an embodiment, a plurality of gate lines GL, a plurality of data lines DL, and a plurality of drive voltage lines DVL are provided.

Each of the signal lines is provided over the display area DA and the non-display area NDA.

The pixel PXL may display an image and be provided in the display area DA. In an embodiment, a plurality of pixels PXL may be provided and arranged in the form of a matrix. In the illustrated embodiment, only one pixel PXL is shown for the sake of brevity. Here, although the pixel PXL has been illustrated as having a rectangular shape, the inventive concepts are not limited to this shape. The pixel PXL may have various shapes.

Each pixel PXL includes the thin-film transistor connected to a corresponding one of the signal lines, a light emitting element connected to the transistor, and a capacitor Cst.

The thin film transistor may include a drive thin-film transistor TR2 for controlling the light emitting element, and a switching thin-film transistor TR1 for switching the drive thin-film transistor TR2. Although, each pixel PXL is illustrated as including two thin-film transistors TR1 and TR2, the inventive concepts are not limited to this arrangement. For example one thin-film transistor and one capacitor may be provided for each pixel PXL, or three or more thin-film transistors and two or more capacitors may be provided for each pixel PXL.

The switching thin-film transistor TR1 may include a first gate electrode GE1, a first source electrode SE1, and a first drain electrode DE1. The first gate electrode GE1 may be connected to the gate line GL. The first source electrode SE1 may be connected to the data line DL. The first drain electrode DE1 may be connected to a gate electrode (i.e., second gate electrode GE2) of the drive thin-film transistor TR2. The switching thin-film transistor TR1 may transmit a data signal applied to the data line DL to the drive thin-film transistor TR2 in response to a scan signal applied to the gate line GL.

The drive thin-film transistor TR2 may include a second gate electrode GE2, a second source electrode SE2, and a second drain electrode DE2. The second gate electrode GE2 may be connected to the switching thin-film transistor TR1. The second source electrode SE2 may be connected to the drive voltage line DVL, and the second drain electrode DE2 may be connected to the light-emitting element.

The light-emitting element may include a light-emitting layer EML, and a first electrode EL1 and a second electrode EL2 which face each other with the light-emitting layer EML interposed therebetween. The first electrode EL1 may be connected to the second drain electrode DE2 of the drive thin-film transistor TR2. A common voltage may be applied to the second electrode EL2. The light-emitting layer EML may emit light or not emit light depending on an output signal of the drive thin-film transistor TR2, thus displaying an image. Here, light emitted from the light-emitting layer EML may be changed depending on the material of the light-emitting layer, and may be color light or white light.

The capacitor Cst may be coupled between the second gate electrode GE2 and the second source electrode SE2 of the drive thin-film transistor TR2 and function to charge and retain a data signal to be inputted to the second gate electrode GE2 of the drive thin-film transistor TR2.

Hereinafter, the pixel PXL in accordance with an exemplary embodiment will be described in a stacked structure according to sequential manufacturing process steps.

The pixel PXL according to the illustrated embodiment is provided on the second base substrate BS2.

The buffer layer BFL is provided on the second base substrate BS2. The buffer layer BFL may prevent impurities from diffusing from the second base substrate BS2 and enhance planarization of the second base substrate BS2. The buffer layer BFL may be provided in a single layer structure or a multilayer structure having at least two or more layers. The buffer layer BFL may be an inorganic insulating layer formed of inorganic material. For example, the buffer layer BFL may be formed of silicon nitride, silicon oxide, silicon oxynitride, or the like. In the case where the buffer layer BF has a multilayer structure, the respective layers may be formed of the same material or different materials. The buffer layer BFL may be omitted depending on the material and processing conditions of the second base substrate BS2.

A first active pattern ACT1 and a second active pattern ACT2 may be provided on the buffer layer 120. The first active pattern ACT1 and the second active pattern ACT2 may be formed of semiconductor material. Each of the first and second active patterns ACT1 and ACT2 may include a source area SCA, a drain region DRA, and a channel area CNA provided between the source area SCA and the drain area DRA. Each of the first and second active patterns ACT1 and ACT2 may be a semiconductor pattern made of poly silicon, amorphous silicon, an oxide semiconductor, or the like. Particularly, the channel region CNA may be a semiconductor pattern undoped with an impurity and thus be an intrinsic semiconductor. Each of the source area SCA and the drain area DRA may be a semiconductor pattern doped with an impurity. The impurity may be an impurity such as an n-type impurity, a p-type impurity or other metals.

A gate insulating layer GI may be provided on each of the first and second active pattern ACT1 and ACT2.

The first gate electrode GE1 connected to the gate line GL, and the second gate electrode GE2 may be provided on the gate insulating layer GI. The first gate electrode GE1 and the second gate electrode GE2 may be respectively formed to cover areas corresponding to the respective channel areas CNA of the first and second active patterns ACT1 and ACT2.

An interlayer insulating layer IDL may be provided on the first gate electrode GE1 and the second gate electrode GE2 so as to cover the first gate electrode GE1 and the second gate electrode GE2.

The first source electrode SE1, the first drain electrode DE1, the second source electrode SE2, and the second drain electrode DE2 may be provided on the interlayer insulating layer IDL. The first source electrode SE1 and the first drain electrode DE1 may be respectively connected to the source area SCA and the drain area DRA of the first active pattern ACT1 through contact holes formed in the interlayer insulating layer IDL and the gate insulating layer GI. The second source electrode SE2 and the second drain electrode DE2 may be respectively connected to the source area SCA and the drain area DRA of the second active pattern ACT2 through contact holes formed in the interlayer insulating layer IDL and the gate insulating layer GI.

A portion of the second gate electrode GE2 and a portion of the drive voltage line DVL may be respectively a first capacitor electrode CE1 and a second capacitor electrode CE2, and form the capacitor Cst with the interlayer insulating layer IDL interposed therebetween.

A protective layer PSV may be provided on the first source electrode SE1, the first drain electrode DE1, the second source electrode SE2, and the second drain electrode DE2. The protective layer PSV may cover the switching thin-film transistor TR1 and the drive thin-film transistor TR2 and planarize upper surfaces thereof.

The first electrode EL1 may be provided on the protective layer PSV as an anode of the light-emitting element. The first electrode EL1 may be connected to the second drain electrode DE2 of the drive thin-film transistor TR2 through a contact hole formed in the protective layer PSV. The first electrode EL1 may be used as a cathode, but in the following embodiment, there will be described an example in which it is used as an anode.

The first electrode EL1 may be formed of material having a high work function. In the case where an image is provided in a direction below the second base substrate BS2 based on the drawing, the first electrode EL1 may be formed of a transparent conductive layer made of material such as indium tin oxide (ITO), indium zinc oxide (IZO), zinc oxide (ZnO), and indium tin zinc oxide (ITZO). If it is intended to provide an image in a direction over the second base substrate BS2 based on the drawing, the first electrode EL1 may be formed of a metal reflective layer made of material such as Ag, Mg, Al, Pt, Pd, Au, Ni, Nd, Ir, or Cr, or a transparent conductive layer made of material such as indium tin oxide (ITO), indium zinc oxide (IZO), zinc oxide (ZnO), and indium tin zinc oxide (ITZO).

A pixel defining layer PDL for defining a pixel area corresponding to each pixel PXL is provided on the second base substrate BS2 on which the first electrode EL1, etc. are formed. The pixel defining layer PDL may expose an upper surface of the first electrode EL1 and protrude from the second base substrate BS2 along the periphery of the pixel PXL.

The light-emitting layer EML is provided in the pixel area enclosed by the pixel defining layer PDL.

The light-emitting layer EML may be disposed on the exposed surface of the first electrode EL 1. The light-emitting layer EML may have a multilayer thin-film structure including at least a light generation layer (LGL). For instance, the light-emitting layer EML may include: a hole injection layer (HIL) into which holes are injected; a hole transport layer (HTL) which has excellent hole transportation performance and restrains movement of electrons that have not been coupled with holes in the light generation layer and thus increases chances of recombination between holes and electrons; the light generation layer which emits light by recombination between injected electrons and holes; a hole blocking layer (HBL) which restrains movement of holes that have not been coupled with electrons in the light generation layer; an electron transport layer (ETL) which is provided to smoothly transport electrons to the light generation layer; and an electron injection layer (EIL) into which electrons are injected.

The color of light generated from the light generation layer may be one of red, green, blue and white, but in the present embodiment, this is not limited. For example, the color of light generated from the light generation layer of the light-emitting layer EML may be one of magenta, cyan and yellow.

The second electrode EL2 may be disposed on the light-emitting layer EML.

An encapsulation layer SL is provided on the second electrode EL2. The encapsulation layer SL covers the second electrode EL2. The encapsulation layer SL may be formed of a single layer, or multi-layers. In an embodiment, the encapsulation layer SL may include a first encapsulation layer SL1 and a second encapsulation layer SL2. The first encapsulation layer SL1 and the second encapsulation layer SL2 may include different materials. For example, the first encapsulation layer SL1 may be made of organic material, and the second encapsulation layer SL2 may be made of inorganic material. The layer structure or material of the encapsulation layer SL1 is not limited to this embodiment, and may be changed in various manners. For example, the encapsulation layer SL1 may include a plurality of organic material layers and a plurality of inorganic material layers that are alternately stacked.

A display device constructed according to the principles of the invention may be employed in various electronic devices. For instance, the display device may be applied to a television, a notebook computer, a cellular phone, a smart phone, a smart pad, a portable multimedia player (PMP), a personal digital assistant (PDA), a navigation device, and various kinds of wearable devices such as a smartwatch, etc.

Devices constructed according to the principles of the invention may provide a touch screen and a display device having the same capable of reducing contact resistance of lines, such as signal lines and sensor lines.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. A touch screen comprising:
a base substrate including a sensing area and a peripheral area disposed around the sensing area;
an insulating layer including at least one contact hole;
a sensor provided in the sensing area; and
at least two sensing lines connected to the sensor, each of the at least two sensing lines comprising a first metal layer and a second metal layer disposed in first and second layers, respectively, in the periphery area, each of the metal layers having first and second portions with two distinct widths, the second metal layer being electrically connected to the first metal layer in the contact hole through portions of distinct widths, and
wherein the width of the first portion of the first metal layer is substantially equal to the width of the first portion of the second metal layer in regions of the base substrate outside the contact hole, and
wherein the first portion of each of the at least two sensing lines and the second portion of each of the at least two sensing lines are disposed in the same one of the first and second layers.

2. The touch screen according to claim 1, wherein the width of the first portions is greater than the width of the second portions.

3. The touch screen according to claim 2, wherein the first portion of the first metal layer in at least some of the sensing lines is disposed at a position different from a position of the first portion of the first metal layer of an adjacent sensing line.

4. The touch screen according to claim 3, wherein each of the sensing lines comprises a plurality of contact holes.

5. The touch screen according to claim 4, wherein the sensing lines comprise a first sensing line group including odd number-th sensing lines extending in a lengthwise direction, and a second sensing line group including even number-th sensing lines disposed between the odd number-th sensing lines.

6. The touch screen according to claim 5, wherein the contact holes in the first sensing line groups and the contact holes in to the second sensing line groups are alternately disposed along the lengthwise direction in the base substrate.

7. The touch screen according to claim 1, wherein each of the sensing lines has a different width.

8. The touch screen according to claim 7, wherein the width of at least some of the sensing lines decreases as the sensing line becomes closer to the sensing area.

9. The touch screen according to claim 1, wherein the sensor comprises a plurality of sensing electrodes and a plurality of bridges.

10. The touch screen according to claim 1, wherein the insulating layer is disposed over the base substrate, and the second metal layer is disposed over the first metal layer.

11. A display device comprising:
a display panel to display an image; and
a touch screen disposed on at least one surface of the display panel and sensing a location of a touch,
the display panel comprising:
a first base substrate comprising a display area including a plurality of pixel areas and a non-display area disposed around the display area;
an insulating layer including at least one first contact hole; and
at least two metal lines disposed in the non-display area and connected to the respective pixel areas, each of the at least two metal lines comprising a first metal layer and a second metal layer disposed in first and second layers, respectively, on the first base substrate, each of the metal layers having first and second portions with two distinct widths, the second metal layer electrically being connected to the first metal layer in the first contact hole through portions of distinct widths, wherein the width of the first portion of the first metal layer is substantially equal to the width of the first portion of the second metal layer in regions of the first base substrate outside the first contact hole, and wherein the first portion of each of the at least two metal lines and the second portion of each of the at least two metal lines are disposed in the in the same one of the first and second layers.

12. The display device according to claim 11, wherein the width of the first portion is greater than the width of the second portions.

13. The display device according to claim 11, wherein at least some of the metal lines comprise a fan-out line to provide a signal from a driver to the corresponding pixel area.

14. The display device according to claim 11, wherein the touch screen comprises:
   a second base substrate including a sensing area and a peripheral area disposed around the sensing area;
   a second insulating layer including at least one second contact hole;
   a sensor provided in the sensing area; and
   at least two sensing lines connected to the sensor, each of the at least two sensing lines comprising a third metal layer and a fourth metal layer disposed in the periphery area, the fourth metal layer being electrically connected to the third metal layer through the second contact hole,
   wherein each of the at least two sensing lines includes a third portion adjacent to the second contact hole, and a fourth portion connected with the third portion, with the third portion and the fourth portion having different widths.

15. The display device according to claim 14, wherein the third portion of at least some of the sensing lines is disposed at a position different from a position of the third portion of an adjacent sensing line.

16. The display device according to claim 14, wherein the second insulating layer is disposed over the second base substrate, and the fourth metal layer is disposed over the third metal layer.

17. The touch screen according to claim 14, wherein the sensor comprises a plurality of sensing electrodes and a plurality of bridges.

* * * * *